US012043036B2

(12) United States Patent
Osborne et al.

(10) Patent No.: US 12,043,036 B2
(45) Date of Patent: Jul. 23, 2024

(54) INK SUPPLY TANKS

(71) Applicant: Hewlett-Packard Development Company, L.P., Spring, TX (US)

(72) Inventors: William Scott Osborne, Corvallis, OR (US); Kundan Singh, Singapore (SG); Paul Mark Haines, Corvallis, OR (US); Sean Bertles, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 122 days.

(21) Appl. No.: 17/927,120

(22) PCT Filed: May 27, 2020

(86) PCT No.: PCT/US2020/034691

§ 371 (c)(1),
(2) Date: Nov. 22, 2022

(87) PCT Pub. No.: WO2021/242232

PCT Pub. Date: Dec. 2, 2021

(65) Prior Publication Data

US 2023/0202182 A1 Jun. 29, 2023

(51) Int. Cl.
*B41J 2/175* (2006.01)

(52) U.S. Cl.
CPC ....... *B41J 2/17513* (2013.01); *B41J 2/17509* (2013.01); *B41J 2/17566* (2013.01); *B41J 2/17596* (2013.01)

(58) Field of Classification Search
CPC ................ B41J 2/17513; B41J 2/17509; B41J 2/17566; B41J 2/17596; B41J 2/17553; B41J 2/19
See application file for complete search history.

(56) References Cited

U.S. PATENT DOCUMENTS

| | | | |
|---|---|---|---|
| 6,095,642 | A | 8/2000 | Koitabashi et al. |
| 6,467,890 | B1 | 10/2002 | Tajima et al. |
| 7,252,378 | B2 | 8/2007 | Lee |
| 7,404,630 | B2 | 7/2008 | Shimizu |
| 7,445,323 | B2 | 11/2008 | Anderson, Jr. et al. |
| 9,004,661 | B2 | 4/2015 | Means et al. |

FOREIGN PATENT DOCUMENTS

| | | | |
|---|---|---|---|
| EP | 0639462 | A2 | 2/1995 |
| SU | 1630914 | A1 | 2/1991 |

*Primary Examiner* — Lisa Solomon
(74) *Attorney, Agent, or Firm* — Brooks, Cameron & Huebsch, PLLC

(57) ABSTRACT

The present disclosure is drawn to an ink supply tank for a printer. The ink supply tank includes a main chamber to supply a printer with ink. The main chamber includes a fill port to receive ink during filling and an exchange port to release the ink. A chamber separator device is configured with a fill surface and a vent port. An overflow chamber can be configured with a vent to pass air into the overflow chamber, a first portion of air in the overflow chamber passes through the vent port of the chamber separator device to a feeder chamber to replace a second portion of ink leaving the ink supply tank to feed a print head and the vent port of the chamber separator device to pass a third portion of ink and a second portion of air from the feeder chamber to the overflow chamber.

15 Claims, 7 Drawing Sheets

INK SUPPLY TANKS

BACKGROUND

Printers or printing devices are employed to deploy ink to a media to such as paper. The printer can be an inkjet printer with a print head for delivering the ink to the media. Ink can be stored in a cartridge where the cartridge is disposable and replaceable. In other examples, ink can also be delivered to the print head in a continuous fashion while storing ink in an ink tank. The ink tank can be refillable. A printing system with a refillable ink tank can be referred to as a continuous ink system (CIS), a continuous ink supply system (CISS), a continuous flow system (CFS), an automatic ink refill system (AIRS), a bulk feed ink system (BFIS), or an off-axis ink delivery system (OIDS). A printing system with a refillable ink tank can be used for delivering a large volume of liquid ink to a comparatively small inkjet print head. A printing system with a refillable ink tank may be used for business and professional grade printers to increase printing capacity.

DETAILED DESCRIPTION

Figure 1A:
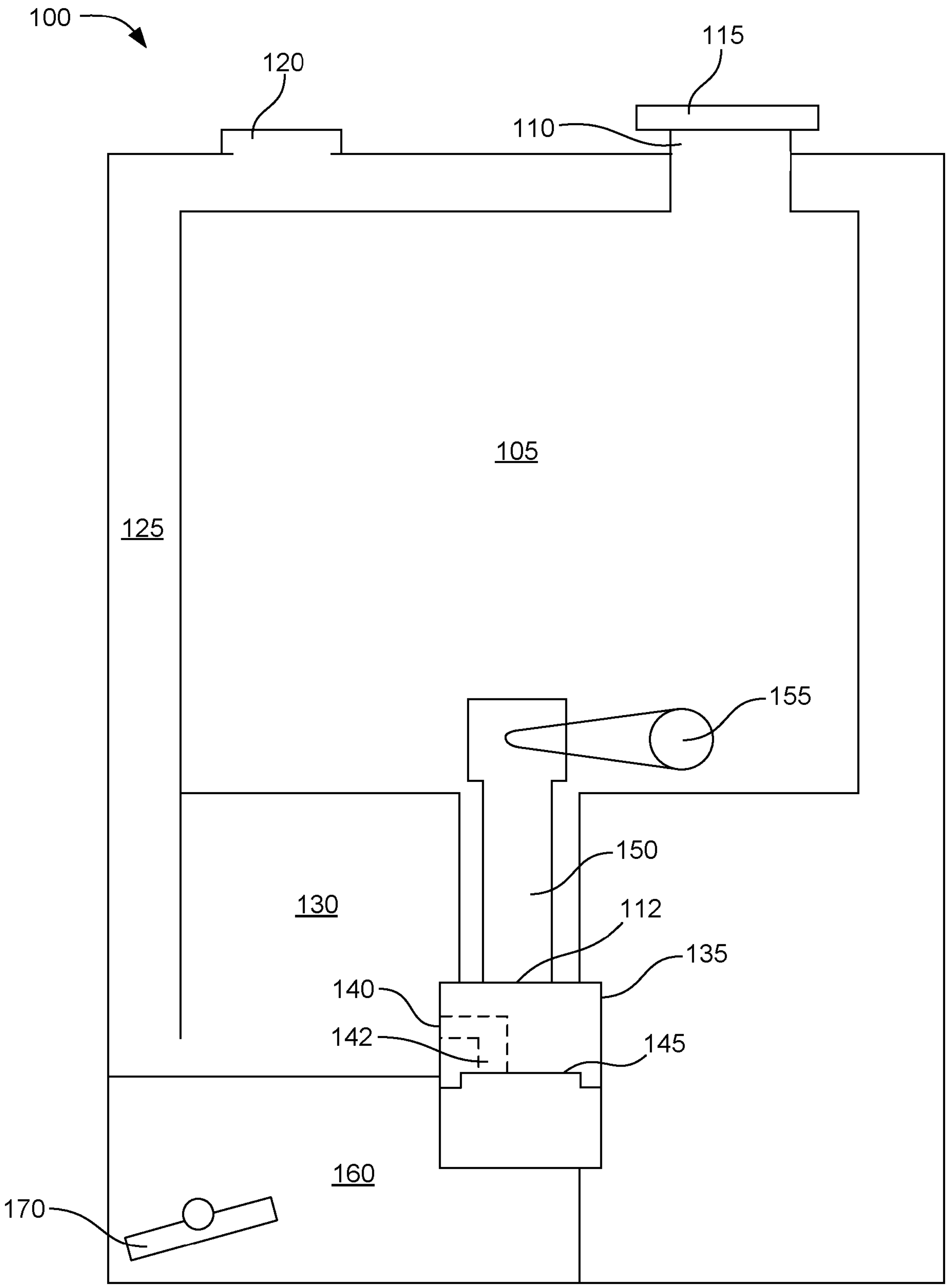
FIGS. 1A and 1B are schematic views illustrating example chamber separator devices with ink supply tanks in accordance with examples of the present disclosure.

The present disclosure describes a chamber separator device that can be pressed into an ink supply tank to separate a main chamber, a feeder chamber, and an overflow system with at least one overflow chamber. The overflow system can connect a vent that vents to the atmosphere and to a venting passageway that travels through the overflow system to a vent port in the chamber separator device. The overflow system can allow air from the atmosphere to pass to the feeder chamber through the vent port in the chamber separator device. The overflow system can also allow overflow ink from the feeder chamber to pass to the overflow chamber and then back to the feeder chamber through the vent port in the chamber separator device. The vent port can be a passageway through the chamber separator device. The passageway through the chamber separator device may change direction as the passageway travels through the chamber separator device. An exchange port in the main chamber allows ink from the main chamber to be exchanged for air from the feeder chamber. The chamber separator device can also have a fill surface that sets a fluid level for ink in the feeder chamber such that ink that passes to the feeder chamber from the main chamber via the exchange port will stop flowing once the ink level in the feeder chamber reaches the fill surface of the chamber separator device.

In one example, an ink supply tank can include a main chamber to supply a printer with ink, wherein the main chamber includes a fill port to receive ink during filling and an exchange port to release the ink. The ink supply tank can further include a chamber separator device with a fill surface and a vent port, wherein the vent port is a passageway through the chamber separator device. The ink supply tank can further include a feeder chamber to exchange a first portion of air located in the feeder chamber with a first portion ink from the main chamber via the exchange port. The ink supply tank can further include an overflow chamber with a vent to pass air into the overflow chamber, wherein a first portion of air in the overflow chamber passes through the vent port of the chamber separator device to the feeder chamber to replace a second portion of ink leaving the ink supply tank to feed a print head and the vent port of the chamber separator device to pass a third portion of ink and a second portion of air from the feeder chamber to the overflow chamber. The first portion of ink can fill the feeder chamber until a fluid level of the first portion of ink contacts the fill surface of the chamber separator device. The overflow chamber can comprise a plurality of chambers connected via passageways wherein an orientation of the chambers and the passageways are arranged to increase the length and provide multiple changes of direction of a path between the vent port of the chamber separator device and the vent of the overflow chamber. The overflow chamber can comprise four chambers connected via passageways. The ink supply tank can further include a screen that is positioned at the feeder chamber to pass the second portion of ink from the feeder chamber to feed the print head. The main chamber can further comprise a valve positioned over the exchange port, wherein an actuator opens and closes the valve. The valve can be closeable during filling of the main chamber. The chamber separator device includes plastic and is pressed fit into the ink supply tank. The main chamber can be positioned above the chamber separator device and the feeder chamber, wherein the first portion of ink is assisted by gravity when passing through the exchange port to fill the feeder chamber.

In another example, a printing system can include a print head to deliver ink to a substrate. The printing system can include an ink supply tank. The ink supply tank can include a main chamber to supply a printer with ink, wherein the main chamber includes a fill port to receive ink during filling and an exchange port to release the ink. The ink supply tank can further include a chamber separator device with a fill surface and a vent port, wherein the vent port is a passageway through the chamber separator device. The ink supply tank can further include a feeder chamber to exchange a first portion of air located in the feeder chamber with a first portion of ink from the main chamber via the exchange port. The ink supply tank can further include an overflow chamber with a vent to pass air into the overflow chamber, wherein a first portion of air in the overflow chamber passes through the vent port of the chamber separator device to the feeder chamber to replace a second portion of ink leaving the ink supply tank to feed a print head and the vent port of the chamber separator device to pass a third portion of ink and a second portion of air from the feeder chamber to the overflow chamber. The printing system can include a conduit to connect the print head to the feeder chamber to provide for delivery of the second portion of ink to the print head. The first portion of ink can fill the feeder chamber until a fluid level of the first portion of ink contacts the fill surface of the chamber separator device. The overflow chamber can comprise a plurality of chambers connected via passageways wherein an orientation of the chambers and the passageways are arranged to increase the length and provide multiple changes of direction of a path between the vent port of the chamber separator device and the vent of the overflow chamber. The ink supply tank can further include a screen positioned at the feeder chamber to pass the second portion of ink from the feeder chamber to the conduit connected to the print head.

In still another example, a method for venting air and flowing ink in an ink supply tank, for example, includes flowing a first portion of ink from a main chamber to a feeder chamber through an exchange port. The method can further include venting a first portion of air from the feeder chamber to the main chamber through the exchange port in exchange for the first portion of ink from the main chamber. The method can further include passing a second portion of ink from the feeder chamber to a conduit connected to a print head. The method can further include venting a second portion of air from the atmosphere through a vent in an overflow chamber into the overflow chamber. The method can further include venting the second portion of air from the overflow chamber to the feeder chamber through a vent port in the chamber separator device to maintain pressure in the feeder chamber after the second portion of ink is passed from the feeder chamber. The first portion of ink can fill the feeder chamber until a fluid level of the first portion of ink contacts the fill surface of the chamber separator device.

It is noted that when discussing the ink supply tank, the printing system, or the method for venting air and flowing ink in an ink supply tank, such discussions of one example are to be considered applicable to the other examples, whether or not they are explicitly discussed in the context of that example. Thus, in discussing a chamber, a specific number of chambers, a component, or a material in the context of the ink supply chamber, such disclosure is also relevant to and directly supported in the context of the printing system, the method for venting air and flowing ink in an ink supply tank, and vice versa.

Ink Supply Tanks with a Chamber Separator Devices

The present disclosure describes an ink supply tank with a chamber separator device. The ink supply tank can be refillable with ink for use with a printing system. The printing system with a refillable ink tank can be referred to as a continuous ink system or an off-axis ink delivery system. The ink supply tank may include multiple chambers. The multiple chambers can have passageways connecting one another that allow air and ink to pass between the multiple chambers. The ink supply tank can include a main chamber for housing ink that can be refillable. The ink supply tank can also include a feeder chamber to provide ink to a print head. Ink from the main chamber can be exchanged for air from the feeder chamber via an exchange port positioned in the main chamber.

The ink in the feeder chamber can pass through a screen in the feeder chamber before passing to the print head. The ink supply tank can also include an overflow chamber connected to a vent that allows atmospheric air to pass to the feeder chamber. The overflow chamber also can allow overflow ink from the feeder chamber to pass to the overflow chamber. A chamber separator device can be employed in the ink supply tank to separate the main chamber, the feeder chamber, and the overflow chamber.

In one example, the chamber separator device can include a vent port that is a passageway that allows air and ink to be passed back and forth between the feeder chamber and the overflow chamber. By placing the vent port in the chamber separator device, the passageway for air and ink can be placed closer to the exchange port in comparison to examples where the air and ink do not pass through the chamber separator device and instead a to passageway directly connects the feeder chamber and the overflow chamber to one another. Additionally, by placing the vent port in the chamber separator device, the passageway for air and ink can be placed away from a film side of the screen.

The chamber separator device can also include a fill surface. The fill surface may be the bottom surface of the chamber separator device. The ink that passes from the main chamber to the feeder chamber can fill the feeder chamber until a fluid level of the ink reaches the fill surface of the chamber separator device. Once the ink level of the feeder chamber reaches the fill surface, flow of the ink from the main chamber will stop or be shut off. As ink is depleted from the feeder chamber during printing, the ink level in the feeder chamber will drop and break a fluid meniscus. Air can then bubble into the main chamber through the exchange port and replenish the ink to the fill height in the feeder chamber. Thus, the fill surface can act as a control for the fluid level or fluid height of the ink in the feeder chamber.

A printing system with the described multiple chambers or split chambers may be described as a bubble tank architecture because the air from the feeder chamber bubbles into the main chamber and allows air in from the main chamber to fill the feeder chamber. The chamber separator device may be described as a bubble bridge. In a printing system with multiple chambers a venting system can be used to allow atmospheric air to pass through to the feeder chamber to allow air from the feeder chamber to bubble into the main chamber and be exchanged with ink. The atmospheric air can pass through the overflow chamber as described above. This is different than a gravity fed tank that has one chamber that feeds ink directly to the print head. In such a gravity fed tank there is no passageway through an overflow system for atmospheric air.

In a printing system with multiple chambers the overflow chamber allows ink from the feeder chamber to pass to the overflow chamber. Ink that passes to the overflow chamber may be described as overflow ink. Overflow ink may pass to the overflow chamber during a physical disruption of the ink supply tank. For example, during a transit of the ink supply tank the ink supply tank may change positions or orientations. During transit the ink supply tank may be rotated, positioned upside down, positioned on a side of the ink supply tank, or placed in any other orientation. The overflow chamber allows ink from within the feeder chamber a place to travel to during such a physical disruption. Overflow ink that passes to the overflow chamber may pass back to the feeder chamber or may remain in the overflow chamber.

Regarding FIGS. 1A-1G, common reference numerals are used in the various views of the ink supply tanks 100 and respective chamber separator device 135, and thus, description related to any reference number in FIGS. 1A-1G relates to any of the other of FIGS. 1A-1G, whether described specifically in the context of a particular FIG. or not.

FIG. 1A shows a cross-sectional schematic view of an example ink supply tank 100 for a printing system. The ink supply tank can include a main chamber 105. The main chamber can house or contain ink that is to be used by a print head of the printing system to print onto a substrate or media. The main chamber can be filled and/or refilled with ink. For example, the ink can be filled or refilled via a refill port 110. The refill port can be closed via a cap 115. The cap can be hinged and therefore connected to a housing of the ink supply tank. A seal such as a gasket or bung seal can be used with the cap and the refill port to ensure that ink will not pass out of the refill port when the cap is closed over the refill port.

Ink from the main chamber 105 can pass through an exchange port 112 of the main chamber. The term “exchange port” refers to a structure located in the main chamber and connects to the feeder chamber to allow air and ink to be exchanged between the main chamber and the feeder chamber. For example, air can bubble up from the feeder chamber through the exchange port to the main chamber and thus cause ink to pass through the exchange port to the feeder chamber. In one example, the exchange port does not pass through the chamber separator device 135. In FIG. 1A the exchange port may be located behind or in front of the chamber separator device in the view depicted. A valve 150 can be used to close or open the exchange port. The valve can be controlled via an actuator 155. The valve may be closed while the main chamber is being refilled with ink. The valve may be open during transit of the ink supply tank and during normal printing operations of the printing system. FIG. 1A depicts the valve as being closed against the exchange port. The main chamber can be positioned above the chamber separator device and the feeder chamber such that the ink in the main chamber is assisted by gravity when passing through the exchange port to fill the feeder chamber.

The ink supply tank 100 can further include a feeder chamber 160. The feeder chamber can be filled with ink to an ink fill level. The ink fill level can also be described as a fluid height, an ink height, or a fluid level. The ink fill level can be controlled via a fill surface 145 of a chamber separator device 135. The fill surface may be a bottom surface of the chamber separator device meaning that the fill surface faces a bottom surface of the ink supply tank opposite the refill port 110. Ink from the main chamber 105 may fill the feeder chamber until the ink fill level reaches the fill surface and the ink flow from the main chamber is stopped. Ink from the feeder chamber can pass from the feeder chamber to a print head through a screen 170. The screen can have a film over a surface of the screen. The screen may filter the ink that passes from the feeder chamber to the print head. Once ink has passed from the feeder chamber to the print head, air pressure may change in the feeder chamber. The change in air pressure may affect how air from the feeder chamber bubbles into the main chamber in exchange for ink to replenish the ink in the feeder chamber. To regulate the air pressure in the feeder chamber, atmospheric air can be vented into the feeder chamber. Vent 120 can allow atmospheric air to pass into the ink supply tank. The atmospheric air can pass through an overflow passageway 125 into an overflow chamber 130. The atmospheric air can then pass through a vent port 140 and a passageway 142 in the chamber separator device into the feeder chamber.

The chamber separator device 135 can be composed of a material such as plastic. The features of the chamber separator device including the vent port 140, the passageway 142, and the fill surface 145 can be molded into the chamber separator device during a manufacturing process of the chamber separator device. Other techniques such as computer numerical control (CNC) can be employed to manufacture the chamber separator device. Other materials, such as metal, metal alloys, composites, etc, can be employed to manufacture the chamber separator device. The chamber separator device can be pressed into the ink supply tank 100 to separate the main chamber 105, the feeder chamber 160, and the overflow chamber 130.

The vent 120 can be described as an atmospheric vent. During a physical disruption of the ink supply tank 100 such as transit, ink from the feeder chamber 160 can pass through the vent port 140 and the passageway 142 of the chamber separator device 135 and into the overflow chamber 130. This passage of ink into the overflow chamber during a physical disruption assists in preventing the ink in the feeder chamber from being passed through the screen 170 and out of the ink supply tank. For example, when the ink supply tank changes orientation during a physical disruption, ink in the feeder chamber may pass into the overflow chamber thus allowing air to take the place of the ink that was in the feeder chamber, subsequently the screen may be in contact with air during the physical disruption thus preventing ink from passing through the screen. After or during the physical disruption, the ink in the overflow chamber may pass back into the feeder chamber or may remain in the overflow chamber.

The overflow chamber 130 and the overflow passageway 125 can be described as an overflow system. Ink that passes into the overflow chamber may ultimately be passed through the overflow passageway and out the vent 120. To prevent such a scenario, the ink supply tank may be constructed to increase the length of a path that the ink travels through the overflow system before passing out the vent. The path through the overflow system may also be designed to change directions or orientations further preventing the ink from traveling the full length of the path and passing out the vent. For example, the overflow system can be constructed with a plurality of overflow chambers. The plurality of overflow chambers may be connected to one another via passageways. The path through the overflow system may form a maze-like pattern. Atmospheric air from the vent can easily pass through the length of the path through the overflow system due to atmospheric pressure. However, the maze-like pattern creates an overflow system where the overflow ink is unlikely to exit the vent. Thus, in an ink supply tank with multiple chambers, the path through the overflow system can provide a passageway for both atmospheric air and ink to pass between the overflow system and the feeder chamber. The present technology also provides for the path through the overflow system to pass through the chamber separator device 135 via the vent port 140 and the passageway 142. In one example, the overflow system comprises four overflow chambers connected to one another via passageways where one of the overflow chambers connects to the vent port of the chamber separator device as is depicted in FIG. 1B.

Figure 1B:
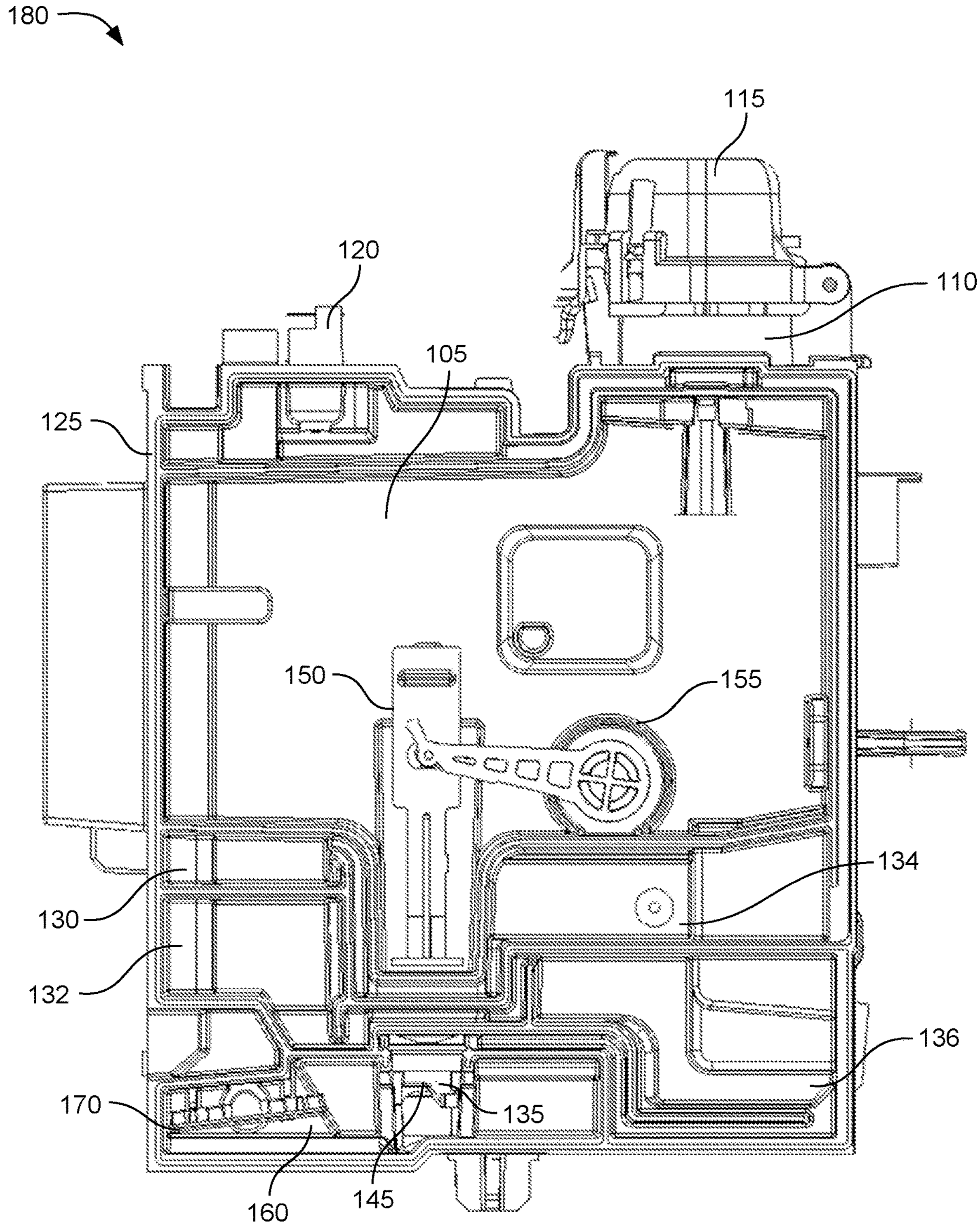

FIG. 1B shows a more detailed schematic view of an example ink supply tank 180 for a printing system. The ink supply tank 180 may have all of the same features, capabilities and limitations of the ink supply tank 100 of FIG. 1A. The ink supply tank 180 depicts a contoured view of the ink supply tank as compared to the ink supply tank 100 of FIG. 1A. The ink supply tank 180 depicts four overflow chambers 130, 132, 134, and 136. The overflow chambers 130, 132, 134, and 136 are connected to one another via passageways thus forming a continuous path from the vent in the chamber separator device 135 to the vent 120. FIG. 1B depicts the overflow chamber 136 as being connected to the vent port 140 of the chamber separator device via a passageway as is more clearly depicted in FIG. 10. It should be appreciated that an ink supply tank can include any number of overflow chambers.

Figure 1C:
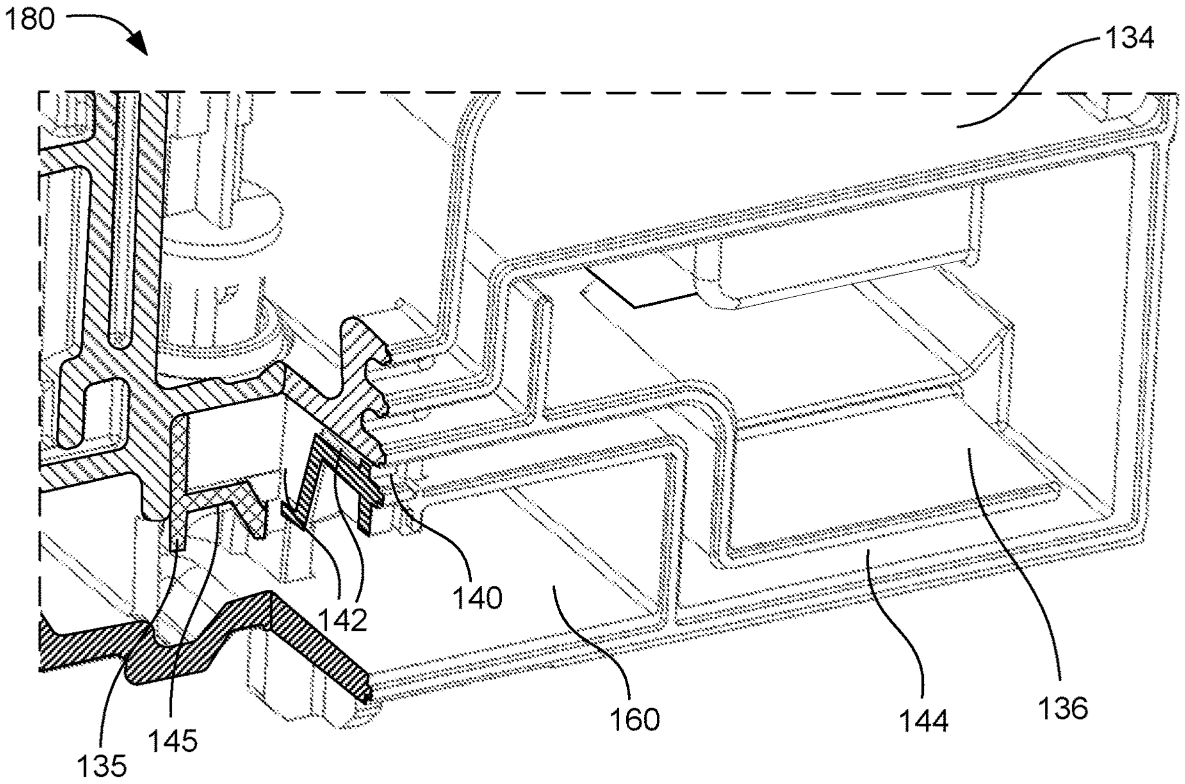
FIG. 1C is an isometric cross-sectional view illustrating another example chamber separator device in an ink supply tank in accordance with examples of the present disclosure.
Figure 1D:
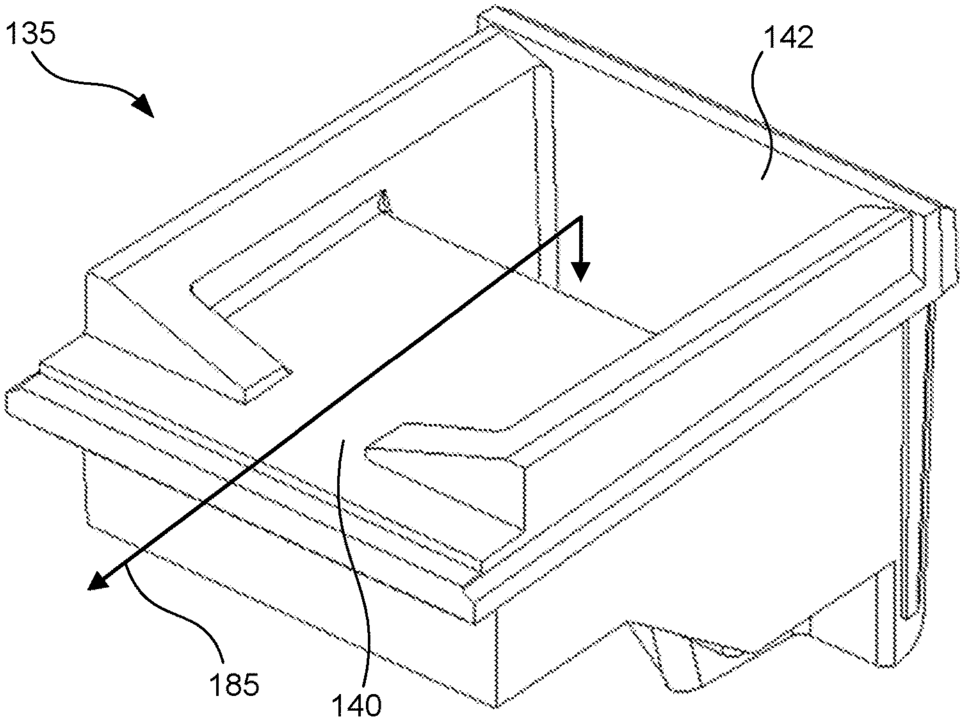
FIGS. 1D-1F are isometric views illustrating example chamber separator devices in accordance with examples of the present disclosure.

FIG. 1C shows a portion of a cross-sectional isometric view of the example ink supply tank 180 for a printing system. FIG. 1C depicts the path of an overflow system to pass from overflow chamber 134 to overflow chamber 136 to vent port 140 of the chamber separator device 135 via a passageway 144. The path then continues through the passageway 142 of the chamber separator device to the feeder chamber 160.

FIG. 10 shows a top down isometric view of an example chamber separator device 135 for an ink supply tank. The arrow 185 depicts the passageway 142 that overflow ink and atmospheric air can take to pass through the chamber separator device between the feeder chamber and the overflow chamber. The arrow 185 depicts how the passageway through the chamber separator device can change directions or orientations in the chamber separator device.

Figure 1E:
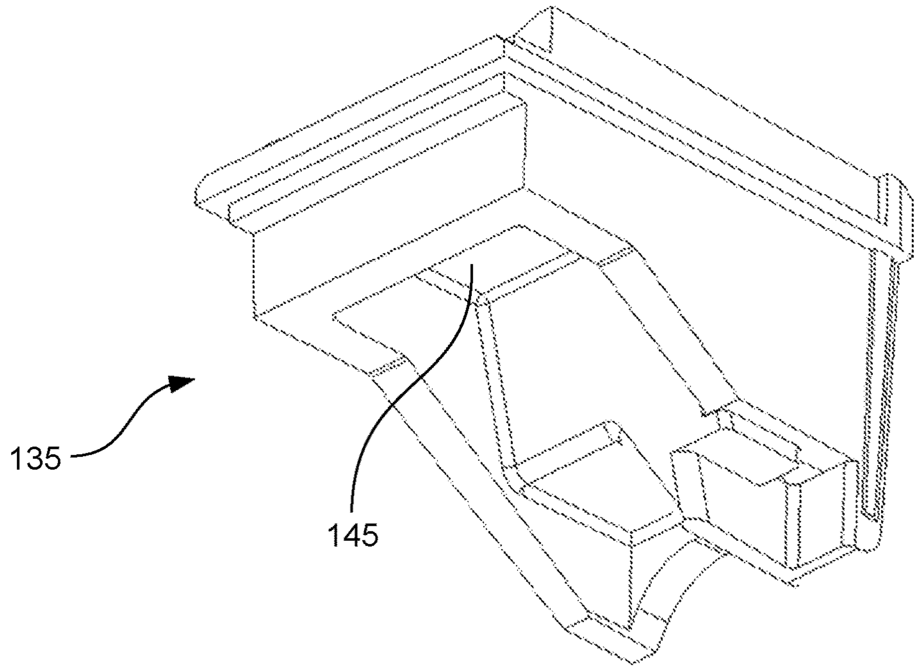
Figure 1F:
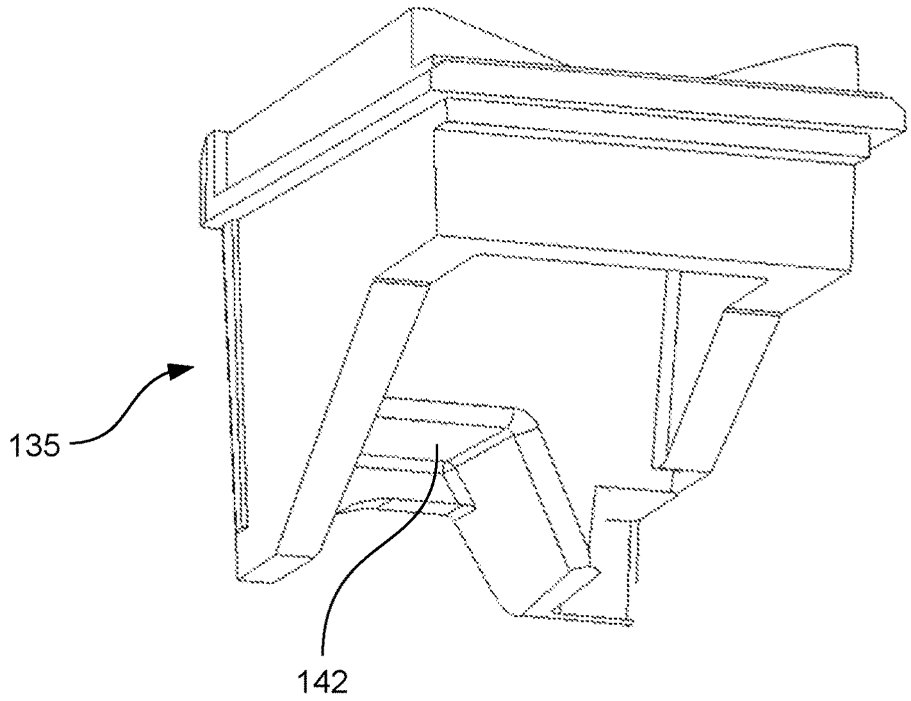
Figure 1G:
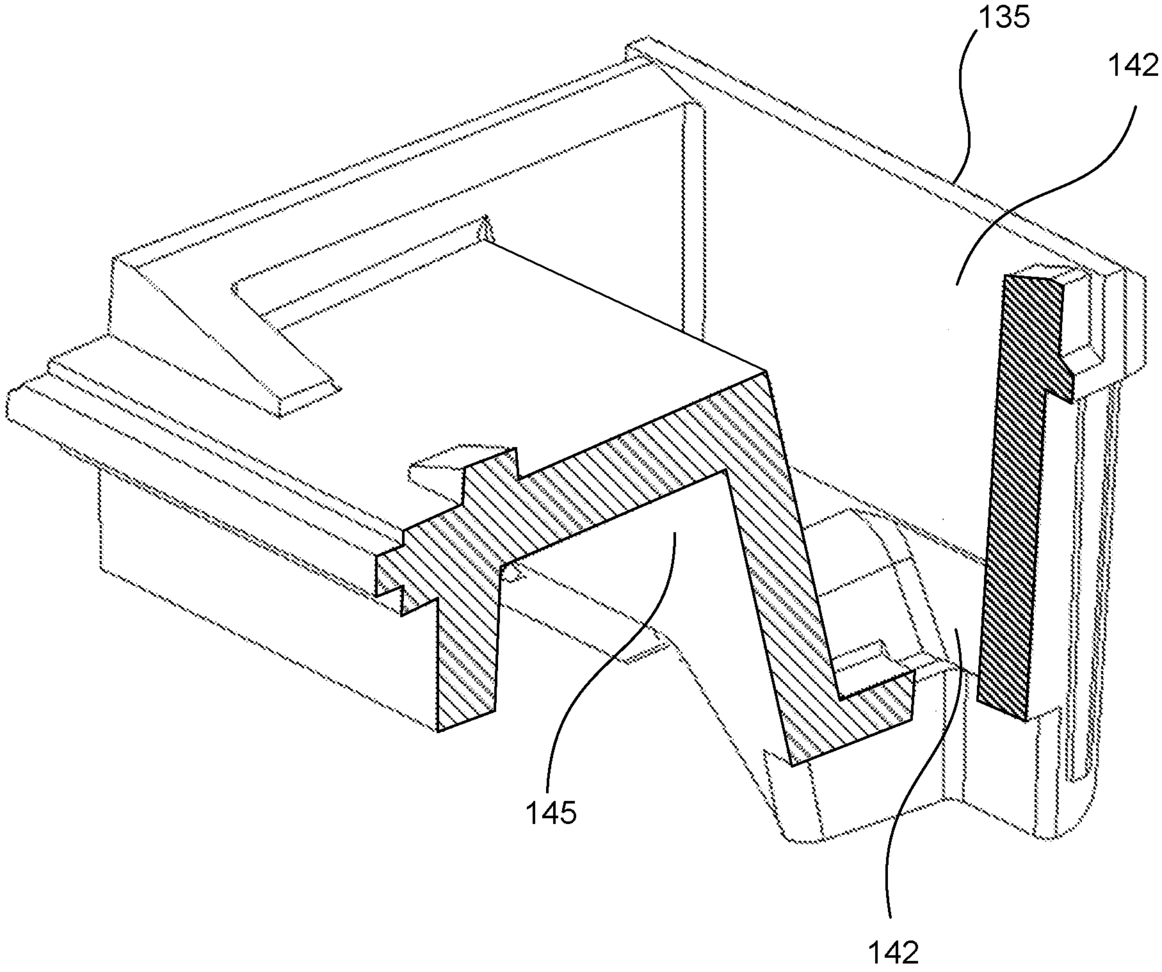
FIG. 1G is an isometric cross-sectional view illustrating another example chamber separator device in accordance with examples of the present disclosure.

FIG. 1E, FIG. 1F, and FIG. 1G (in cross-section) show bottom up isometric views of an example chamber separator device 135 for an ink supply tank. From these FIGS., again, a passageway 142 is shown through the chamber separator device as well as the fill surface 145.

Printing Systems

A variety of printing systems can be made with the ink supply tanks with chamber separator devices described herein. In various examples, such printing systems can be described as a printing system with a refillable ink tank. The ink supply tank with a chamber separator device of the present technology can be employed in a continuous ink system (CIS), a continuous ink supply system (CISS), a continuous flow system (CFS), an automatic ink refill system (AIRS), a bulk feed ink system (BFIS), an off-axis ink delivery system (GIDS), or other printing system.

Figure 2:
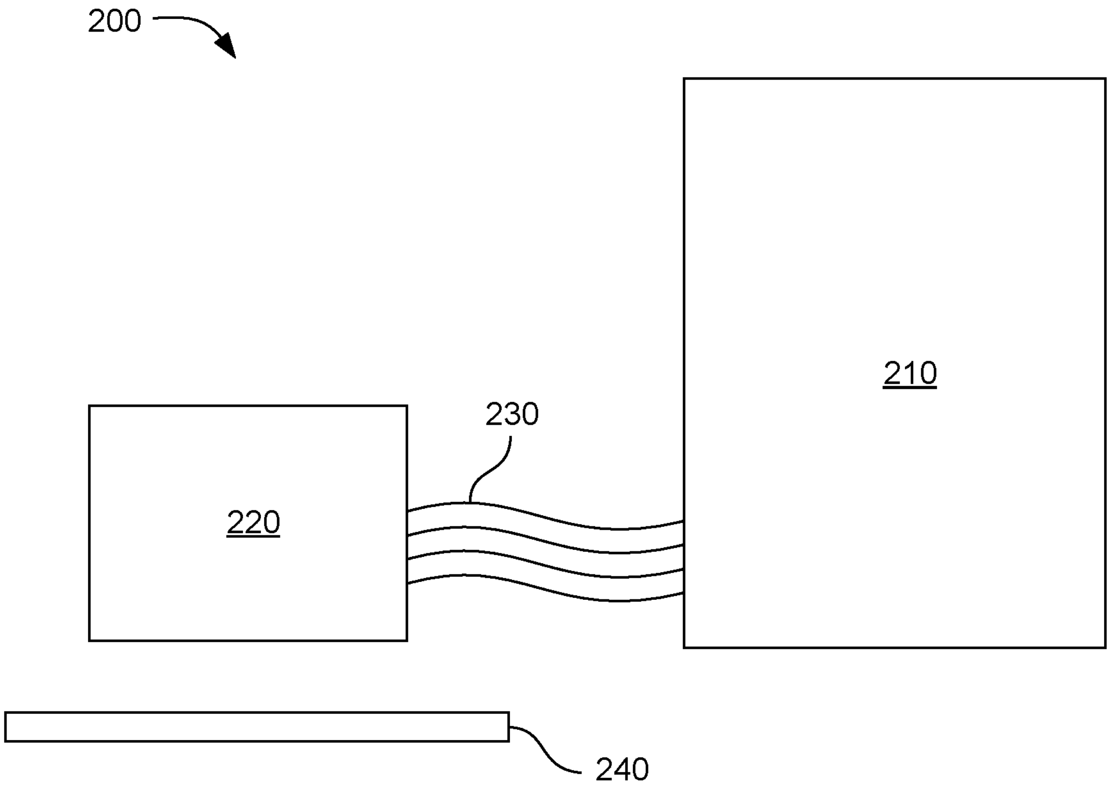
FIG. 2 is a block diagram illustrating an example printing system in accordance with examples of the present disclosure.

FIG. 2 depicts a block diagram of a printing system 200 for printing onto a substrate 240. The substrate can be a media such as paper, plastic, cardboard, etc. The printing system may print onto the substrate via a print head 220. Ink may be supplied to the print head via a conduit 230. The conduit may supply the ink to a refillable cartridge associated with the print head. The printing system can include an ink supply tank 210. It should be appreciated that the ink supply tank may have all of the same features, capabilities, and limitations of the ink supply tank 100 of FIGS. 1A-1G. A screen in a feeder tank of the ink supply tank may provide or feed ink through the conduit to the print head. The conduit may include a plurality of conduits. The print head may include a plurality of print heads. The printing system may include other features not depicted such as a housing, a substrate feeder, a drive system, electronics, a display, user controls, a power source, a data port, a networking interface, etc.

Methods for Venting Air and Flowing Ink in an Ink Supply Tank

Figure 3:
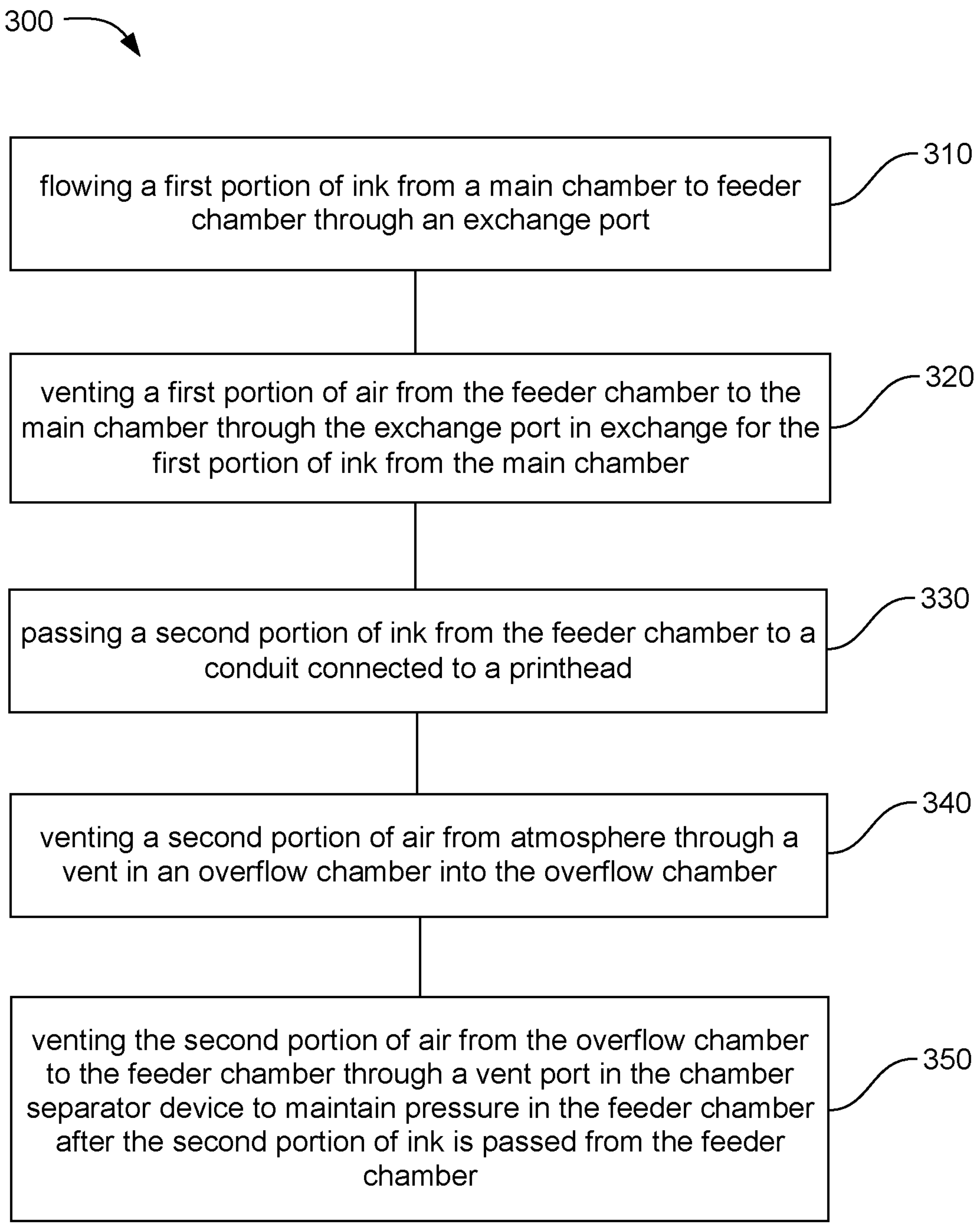
FIG. 3 is a flowchart illustrating an example method for venting air and flowing ink in an ink supply tank in accordance with the present disclosure.

FIG. 3 is a flowchart illustrating an example method 300 for venting air and flowing ink in an ink supply tank. The method includes flowing 310 a first portion of ink from a main chamber to a feeder chamber through an exchange port. The method includes venting 320 a first portion of air from the feeder chamber to the main chamber through the exchange port in exchange for the first portion of ink from the main chamber. The method includes passing 330 a second portion of ink from the feeder chamber to a conduit connected to a print head. The method includes venting 340 a second portion of air from the atmosphere through a vent in an overflow chamber into the overflow chamber. The method includes venting 350 the second portion of air from the overflow chamber to the feeder chamber through a vent port in the chamber separator device to maintain pressure in the feeder chamber after the second portion of ink is passed from the feeder chamber. The method can further include the first portion of ink filling the feeder chamber until a fluid level of the first portion of ink contacts the fill surface of the chamber separator device.

Definitions

It is noted that, as used in this specification and the appended claims, the singular forms "a" "an," and "the" include plural referents unless the content clearly dictates otherwise.

The term "about" as used herein, when referring to a numerical value or range, allows for a degree of variability in the value or range, for example, within 5% or other reasonable added range breadth of a stated value or of a stated limit of a range. The term "about" when modifying a numerical range is also understood to include the exact numerical value indicated, e.g., the range of about 1 wt % to about 5 wt % includes 1 wt % to 5 wt % as an explicitly supported sub-range.

The term "substrate" as used herein, is a term used in printing to describe media or medium upon which a material such as ink can be deposited in predefined patterns.

The term "printer" or "printing system" as used herein, refers to a printing device that is used for printing onto a substrate or media. The printer may be connected via a data or network connection to an electronic device such as a computing system. The computing system may control the printer or send commands to the printer.

As used herein, a plurality of items, structural elements, compositional elements, and/or materials may be presented in a common list for convenience. However, these lists should be construed as though the individual members of the list are individually identified as a separate and unique member.

Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if individual numerical values and sub-ranges are explicitly recited. For example, a layer thickness from about 0.1 μm to about 0.5 μm should be interpreted to include the explicitly recited limits of 0.1 μm to 0.5 μm, and to include thicknesses such as about 0.1 μm and about 0.5 μm, as well as subranges such as about 0.2 μm to about 0.4 μm, about 0.2 μm to about 0.5 μm, about 0.1 μm to about 0.4 μm etc.

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

EXAMPLES

An example ink supply tank for a printer is prepared as follows:

1) A main chamber to house ink is formed in the ink supply tank with a refill port and an exchange port, 2) A valve controlled by an actuator is positioned in the main chamber to open and dose the exchange port.
3) A feeder chamber is formed in the ink supply tank, is positioned under the main chamber, and is connected to the main chamber via the exchange port where the exchange port allows air from the feeder chamber to be exchanged for ink from the main chamber and the ink is assisted by gravity in passing to the feeder chamber.
4) A chamber separator device is composed of plastic and press fitted into the ink supply tank to separate the main chamber, the feeder chamber, and an overflow system. The chamber separator device has a vent port and a passageway through the chamber separator device separating the feeder chamber from the overflow system. The chamber separator device has a fill surface to stop a flow of ink from the main chamber into the feeder chamber via the exchange port once the fill level of the ink in the feeder chamber has reached the fill surface.
5) The overflow system has a vent in a top surface of the ink supply tank to allow atmospheric air to pass into the overflow system. The vent is connected to an overflow chamber via a passageway. The overflow chamber is connected to the chamber separator device via the vent port of the chamber separator device. Atmospheric air and overflow ink pass through the vent port of the chamber separator device between the overflow chamber and the feeder chamber.

An example ink supply tank for a printer is prepared as follows:

1) A main chamber to house ink is formed in the ink supply tank with a refill port and an exchange port.
2) A valve to the exchange port controlled by an actuator is positioned in the main chamber and is configured to open the valve during normal printing operations and to close the valve during refill operations of the main chamber.
3) A feeder chamber is formed in the ink supply tank and is connected to the main chamber via the exchange port where the exchange port allows air from the feeder chamber to be exchanged for ink from the main chamber.
4) A chamber separator device in the ink supply tank is used to separate the main chamber, the feeder chamber, and an overflow system. The chamber separator device has a vent port and a passageway through the chamber separator device separating the feeder chamber from the overflow system. The chamber separator device has a fill surface to stop a flow of ink from the main chamber into the feeder chamber via the exchange port once the fill level of the ink in the feeder chamber has reached the fill surface.
5) The overflow system has a vent in a top surface of the ink supply tank to allow atmospheric air to pass into the overflow system. The vent is connected to a series of four overflow chambers via a passageway. The overflow chambers are connected to one another via passageways that change in orientation. A final passageway connects the last chamber of the four chambers to the chamber separator device via the vent port of the chamber separator device. Atmospheric air and overflow ink pass through the vent port of the chamber separator device between the overflow chambers and the feeder chamber.

What is claimed is:

1. An ink supply tank for a printer, comprising:

a main chamber to supply a printer with ink, wherein the main chamber includes a fill port to receive ink during filling and an exchange port to release the ink;

a chamber separator device with a fill surface and a vent port, wherein to the vent port is a passageway through the chamber separator device;

a feeder chamber to exchange a first portion of air located in the feeder chamber with a first portion ink from the main chamber via the exchange port; and an overflow chamber with a vent to pass air into the overflow chamber, wherein a first portion of air in the overflow chamber passes through the vent port of the chamber separator device to the feeder chamber to replace a second portion of ink leaving the ink supply tank to feed a print head, and the vent port of the chamber separator device to pass a third portion of ink and a second portion of air from the feeder chamber to the overflow chamber.

2. The ink supply tank of claim 1, wherein the first portion of ink fills the feeder chamber until a fluid level of the first portion of ink contacts the fill surface of the chamber separator device.

3. The ink supply tank of claim 1, wherein the overflow chamber comprises a plurality of chambers connected via passageways wherein an orientation of the chambers and the passageways are arranged to increase the length and provide multiple changes of direction of a path between the vent port of the chamber separator device and the vent of the overflow chamber.

4. The ink supply tank of claim 1, wherein the overflow chamber comprises four chambers connected via passageways.

5. The ink supply tank of claim 1, further including a screen is positioned at the feeder chamber to pass the second portion of ink from the feeder chamber to feed the print head.

6. The ink supply tank of claim 5, wherein the main chamber further comprises a valve positioned over the exchange port, wherein an actuator opens and closes the valve.

7. The ink supply tank of claim 6, wherein the valve is closeable during filling of the main chamber.

8. The ink supply tank of claim 1, wherein the chamber separator device includes plastic and is pressed fit into the ink supply tank.

9. The ink supply tank of claim 1, wherein the main chamber is positioned above the chamber separator device and the feeder chamber, wherein the first portion of ink is assisted by gravity when passing through the exchange port to fill the feeder chamber.

10. A printing system, comprising:

a print head to deliver ink to a substrate;

an ink supply tank, comprising:

a main chamber to supply the print head with the ink, wherein the main chamber comprises a fill port to refill the ink and an exchange port to release the ink;

a chamber separator device with a fill surface and a vent port, wherein the vent port is a passageway through the chamber separator device;

a feeder chamber to exchange a first portion of air located in the feeder chamber with a first portion ink from the main chamber via the exchange port;

an overflow chamber with a vent to pass air into the overflow chamber, wherein a first portion of air in the overflow chamber passes through the vent port of the chamber separator device to the feeder chamber to replace a second portion of ink leaving the ink supply tank to feed a print head, and the vent port of the chamber separator device to pass a third portion of ink and a second portion of air from the feeder chamber to the overflow chamber; and a conduit to connect the print head to the feeder chamber to provide for delivery of the second portion of ink to the print head.

11. The printing system of claim 10, wherein the first portion of ink fills the feeder chamber until a fluid level of the first portion of ink contacts the fill surface of the chamber separator device.

12. The printing system of claim 10, wherein the overflow chamber comprises a plurality of chambers connected via passageways wherein an orientation of the chambers and the passageways are arranged to increase the length and provide multiple changes of direction of a path between the vent port of the chamber separator device and the vent of the overflow chamber.

13. The printing system of claim 10, further comprising a screen positioned at the feeder chamber to pass the second portion of ink from the feeder chamber to the conduit connected to the print head.

14. A method for venting air and flowing ink in an ink supply tank, comprising:

flowing a first portion of ink from a main chamber to feeder chamber through an exchange port;

venting a first portion of air from the feeder chamber to the main chamber through the exchange port in exchange for the first portion of ink from the main chamber;

passing a second portion of ink from the feeder chamber to a conduit connected to a print head;

venting a second portion of air from atmosphere through a vent in an overflow chamber into the overflow chamber; and venting the second portion of air from the overflow chamber to the feeder chamber through a vent port in a chamber separator device to maintain pressure in the feeder chamber after the second portion of ink is passed from the feeder chamber.

15. The method of claim 14, wherein the first portion of ink fills the feeder chamber until a fluid level of the first portion of ink contacts the fill surface of the chamber separator device.

* * * * *